US010133359B2

(12) United States Patent
Gombert

(10) Patent No.: US 10,133,359 B2
(45) Date of Patent: Nov. 20, 2018

(54) 3D INPUT DEVICE HAVING AN ADDITIONAL CONTROL DIAL

(71) Applicant: gomtec GmbH, Seefeld (DE)

(72) Inventor: Bernd Gombert, Worthsee (DE)

(73) Assignee: GOMTEC GMBH, Seefeld (DE)

( * ) Notice: Subject to any disclaimer, the term of this patent is extended or adjusted under 35 U.S.C. 154(b) by 0 days.

(21) Appl. No.: 14/778,315

(22) PCT Filed: Mar. 11, 2014

(86) PCT No.: PCT/EP2014/054663
§ 371 (c)(1),
(2) Date: Sep. 18, 2015

(87) PCT Pub. No.: WO2014/146929
PCT Pub. Date: Sep. 25, 2014

(65) Prior Publication Data
US 2016/0062475 A1 Mar. 3, 2016

(30) Foreign Application Priority Data
Mar. 19, 2013 (DE) .................... 10 2013 004 692

(51) Int. Cl.
*G06F 3/02* (2006.01)
*G05G 9/00* (2006.01)
(Continued)

(52) U.S. Cl.
CPC ............... *G06F 3/02* (2013.01); *G05G 9/00* (2013.01); *G06F 3/0338* (2013.01);
(Continued)

(58) Field of Classification Search
CPC ........ G06F 3/02; G06F 3/0338; G06F 3/0549; G06F 3/062; G06F 3/046; G05G 9/00
(Continued)

(56) References Cited

U.S. PATENT DOCUMENTS 5,561,445 A * 10/1996 Miwa ..................... G06F 3/011
345/163
8,139,033 B2 * 3/2012 Yamamoto .......... G06F 3/03549
345/167
(Continued)

FOREIGN PATENT DOCUMENTS

CN 101362333 A 2/2009
DE 10 2008 019144 A1 10/2009
(Continued)

OTHER PUBLICATIONS

First Office Action in Chinese Application No. 201480016407.1 dated Apr. 24, 2017; 5 pages. [English translation not available].
(Continued)

*Primary Examiner* — Michael Collins
(74) *Attorney, Agent, or Firm* — Schwabe Williamson & Wyatt, PC

(57) ABSTRACT

The invention relates to a 3D input device (1) for controlling the position of an object (8, 14) in space, comprising a manually operable 3D input element (3), at which input element control demands in three spatial coordinates can be input, and a control dial (4), which generates an output signal dependent on the rotational angle when rotated. According to the invention, the 3D input device (1) comprises a control unit (21) which moves the object (8, 14) in space depending on the rotary movement executed at the control dial (4).

12 Claims, 3 Drawing Sheets

Figure 1:
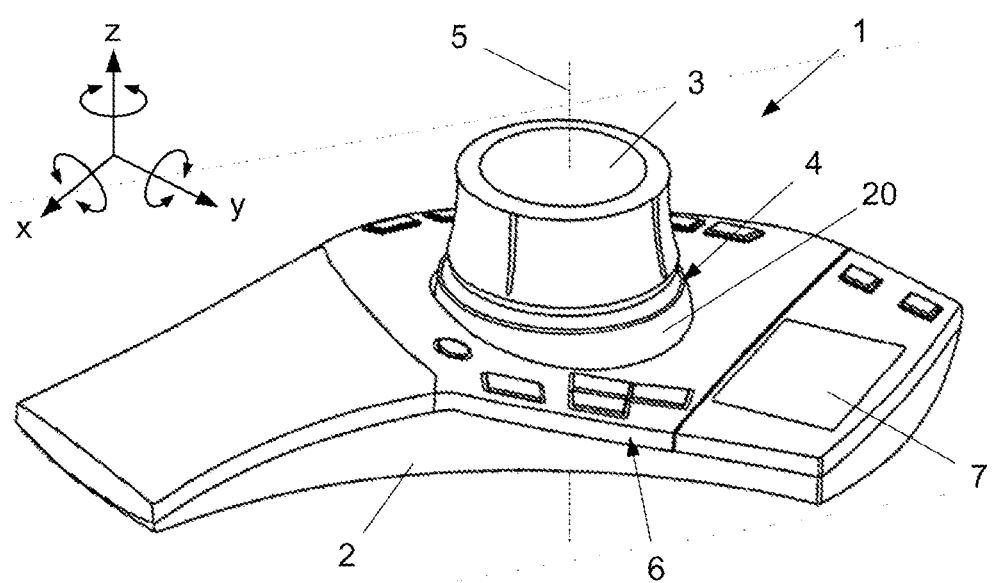

(51) Int. Cl.
*G06F 3/0338* (2013.01)
*G06F 3/0354* (2013.01)
*G06F 3/0362* (2013.01)
*G06F 3/0346* (2013.01)

(52) U.S. Cl.
CPC .......... *G06F 3/0346* (2013.01); *G06F 3/0362* (2013.01); *G06F 3/03549* (2013.01)

(58) Field of Classification Search
USPC ........................................................ 700/264
See application file for complete search history.

(56) References Cited

U.S. PATENT DOCUMENTS

| | | | | |
|---|---|---|---|---|
| 9,678,577 | B1* | 6/2017 | Rutledge | G06F 3/02 |
| 2005/0259077 | A1* | 11/2005 | Adams | G06F 3/0213 |
| | | | | 345/163 |
| 2008/0062126 | A1* | 3/2008 | Algreatly | G06F 3/02 |
| | | | | 345/157 |
| 2008/0100825 | A1* | 5/2008 | Zalewski | A63F 13/06 |
| | | | | 356/29 |
| 2009/0303180 | A1* | 12/2009 | Chin | G06F 3/0338 |
| | | | | 345/157 |
| 2011/0018867 | A1* | 1/2011 | Shibamiya | G06F 3/011 |
| | | | | 345/419 |
| 2011/0063212 | A1* | 3/2011 | Ries | G06F 3/0338 |
| | | | | 345/157 |
| 2016/0062475 | A1* | 3/2016 | Gombert | G06F 3/0338 |
| | | | | 74/471 R |
| 2017/0153672 | A1* | 6/2017 | Shin | H04M 1/23 |

FOREIGN PATENT DOCUMENTS

| | | |
|---|---|---|
| JP | 08-255053 A | 1/1996 |
| JP | 2000148382 A | 5/2000 |
| JP | 2003-220588 | 8/2003 |
| JP | 2005-118556 | 5/2005 |
| JP | 2008305274 A | 12/2008 |
| KR | 10-2007-0115931 | 12/2007 |
| WO | 2004/086212 A1 | 10/2004 |

OTHER PUBLICATIONS

Office Action issued in JP2016-503602 dated Jan. 17, 2017; 3 pages.

* cited by examiner

3D INPUT DEVICE HAVING AN ADDITIONAL CONTROL DIAL

The present application is a U.S. National Phase of PCT/EP2014/054663, filed Mar. 11, 2014 entitled "3D INPUT DEVICE HAVING AN ADDITIONAL CONTROL DIAL," which claims priority to German Patent Application No. 10 2013 004 692.0 filed on Mar. 19, 2013, which are incorporated herein by reference in their entirety.

Manually operable input devices which are referred to below serve to control software applications, such as, for example, CAD programs, or to control mobile device or machines, such as, for example, robots, tool, means of transport, or to control other devices. Typically, input devices are, for example, mice, joysticks, keyboards, trackballs or 3D input devices for controlling virtual or real objects in space.

A 3D input device is known, for example, from DE 10 2008 019 144 which comprises a 3D control element as well as an additional control dial. The user can input translational and rotary control demands in or about three spatial axes (i.e. in six degrees of freedom) via the 3D control element. By actuating the control dial, further functions can be executed. Therefore, by rotating the control dial, for example, the sensitivity of the 3D control can be changed, the brightness of a screen can be adjusted or a zoom region can be defined on the screen in which depicted elements can be made larger or smaller depending on the rotational direction.

U.S. Pat. No. 5,561,445 A describes a 3D input device at which translational and rotary control demands can be input in a total of six degrees of freedom. For this purpose, the 3D input device comprises three separate input elements, in particular a trackball, a control dial and a ball, at each of which control demands can be input in one or more degrees of freedom. In total an object can be moved in six degrees of freedom.

A further 3D input device is, for example, known from WO 02 065 269 A1.

Known 3D input devices usually execute a speed control. I.e. a certain displacement of the 3D input element is implemented at a certain speed with which the object is moved in space. A certain position of the 3D input element thus corresponds to a certain speed of the object. If the user would like to stop the object, he must move the 3D input element back into the neutral position. With such a system, an object can, however, only be controlled relatively inaccurately. The methods of speed control are unsuitable for the fine control of an object, such as, for example, of a robot, as it is inaccurate for pinpointed positioning and requires a very high level of ability. One reason for this lies, among other things, in that the robot moves further while the user puts the 3D input element back in the neutral position. In order to be able to control the robot precisely, the user must learn the behavior of the robot in all operating states and regulate it manually.

It is therefore the object of the present invention to create a 3D input device to control the position of an object in space, which is manually operable and enables a simple and accurate control of the object in space.

This object is solved according to the invention by the features specified in the independent claims. Further embodiments of the invention result from the sub-claims.

According to the invention, a 3D input device to control the position of an object in space is proposed which comprises a manually operable 3D input element, at which the translational and/or rotary control demands can be input in or about at least three (Cartesian) spatial coordinates, and which furthermore comprises an additional control dial which generates an output signal depending on the rotational angle during a rotational actuation. According to the invention, a control unit is provided which moves the object translationally in space depending on the rotational movement executed at the control dial. I.e. the controlled object executes a linear, in particular straight-line, movement from a starting point to a target point during an actuation of the control dial. The input device according to the invention therefore offers the possibility to control or to position the object both by means of the 3D input element and by means of the rotary control device. If the rotary control device has a lower sensitivity than the 3D input device, the object can be controlled more precisely by means of the control dial than by means of the 3D input element. Depending on the sensitivity, the object moves at different speeds or different distances in the case of a certain control demand, wherein a higher sensitivity means that the object is moved more quickly or further.

By an "object", in the scope of this document, any machine or any device is understood which is moveable by means of one or more actuators, such as, for example, electromotors. Additionally, the "object" according to the invention can be a virtual object that, for example, is displayed on a screen and can be controlled by the user by means of a software application.

The 3D input device according to the invention can in principle be configured in such a way that either a positioning control or a speed control is executed during an actuation of the 3D input element or of the control dial respectively. According to a preferred embodiment of the invention, a position control is executed during an actuation of the control dial, due to which the object is moved in space according to the rotational movement of the control dial. With the aid of a position control, the user can, as a rule, control a desired target point substantially more quickly and accurately than with a speed control without having to have practiced for long with this.

By a "position control", a control or regulation is understood which implements a control demand executed by the user at the control dial in a corresponding position change of the controlled object. The extent of the rotational movement therein determines the stretch traveled by the controlled object from a start position to an end position, wherein the control demand of the user is transferred into a corresponding movement of the controlled object with a predetermined scaling factor.

According to a specific embodiment of the invention, the 3D input device is configured in such a way that a control demand executed by the user at the 3D input element is transferred into a corresponding speed of the controlled object. During a rotary actuation of the control dial, a position control preferably occurs. Alternatively, a control demand executed at the 3D input element could also cause, for example, a position control. In this case, the sensitivity of the 3D input element is preferably higher than that of the control dial.

The same applies in one embodiment of the invention in which the two input means (the 3D input element and the control dial) execute a speed control.

According to the invention it is provided to further move the object in the case of a rotational movement of the control dial depending on the previous movement path of the object. If the previous movement path, for example, runs along a straight line, the object is preferably moved further along the straight line. In the case of a curve, the object is, on the other hand, preferably moved further along a curve with the same curve radius. According to a specific embodiment, for example an asymptote could be calculated at a point of the previous movement path, in particular the end point, and the object could be moved further along the asymptote.

According to a preferred embodiment of the invention, the 3D input device comprises one or more further input elements such as, for example, buttons, for the demand of a certain movement direction which the object follows in the case of a rotation of the control dial. By means of the further input elements, for example a movement in the x direction, y direction or z direction, or a rotation about one of the axes referred to, can be input. If one of these additional input elements is actuated and the control dial is manually rotated, the object is moved in the desired direction. With the aid of the additional input elements and the control dial, it is therefore possible to move the object in any desired spatial direction and/or to rotate the object about the respective spatial axis. Optionally, the movement direction could also be reconfigured by software.

The movement executed by the controlled object is preferably dependent on the rotational direction of the control dial. According to a preferred embodiment, the 3D input device is designed in such a way that the object is moved in a first movement direction in the case of an actuation of the control dial in a first rotational direction, and in the opposite direction in the case of an actuation of the control dial in the other rotational direction.

According to one embodiment of the invention, the type of the control (i.e. position or speed control) and/or the sensitivity of the respective input device (3D input element or control dial) can be dependent on the position at which the controlled object is located. Therefore, for example, it can be provided that, in the case of an actuation of the control dial, a position control is carried out with a first sensitivity if the controlled object is located within a predetermined region, and a position control is carried out with a second sensitivity if the object is located outside of the region. The sensitivity within the region is preferably lower than outside of the region. The same optionally also applies in the case of an actuation of the 3D input element.

Alternatively, the 3D input device according to the invention can also be designed in such a way that in the case of an actuation of the control dial, a position control is carried out if the controlled object is located within a predetermined spatial region, and a speed control is carried out if the object is located outside of the or another spatial region. The same optionally also applies for an actuation of the 3D input element.

The region referred to above is preferably defined in such a way that the object to be controlled can be moved from the edge of a spatial region to the central point of the region in the case of a full rotation of the control dial. The region is preferably a spatial region which has the shape of a sphere. Alternatively, however, finer or coarser transitions can also be selected, such as has been described above.

The size and/or the location of the spatial region, the type of the control and/or the sensitivity within or outside of the spatial region can preferably be adjusted by the user according to desire, for example by means of a corresponding software menu. Unpracticed users can therefore, for example, select a larger region and/or a lower sensitivity than adept users.

The invention also relates to a method to control an object in space by means of a 3D input device which comprises a manually operable 3D input element, at which the control demands can be input in or about three (Cartesian) spatial coordinates, and a control dial, which generates an output signal dependent on the rotational angle in the case of a rotary actuation, wherein the method comprises the following steps: in reaction to an actuation of the 3D input element: movement of the controlled object depending on the control demand executed at the 3D input element, and, in reaction to an actuation of the control dial: movement of the controlled object depending on the rotational movement executed at the control dial.

For this purpose, the output signals of the 3D input element and the control dial are processed by a control which then controls one or more actuators of the controlled object, or a software application accordingly.

SHORT DESCRIPTION OF THE DRAWINGS

Figure 2:
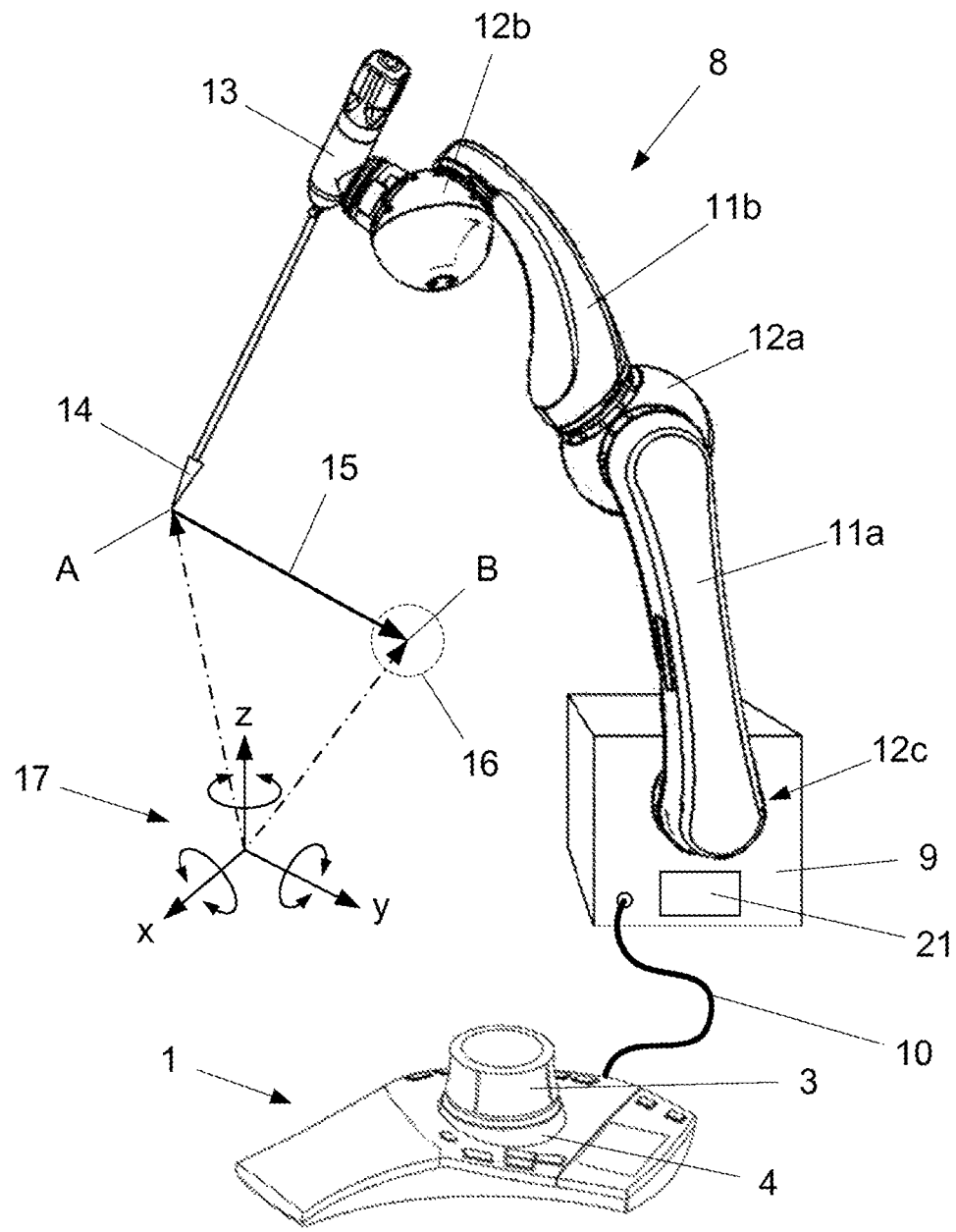
Figure 3:
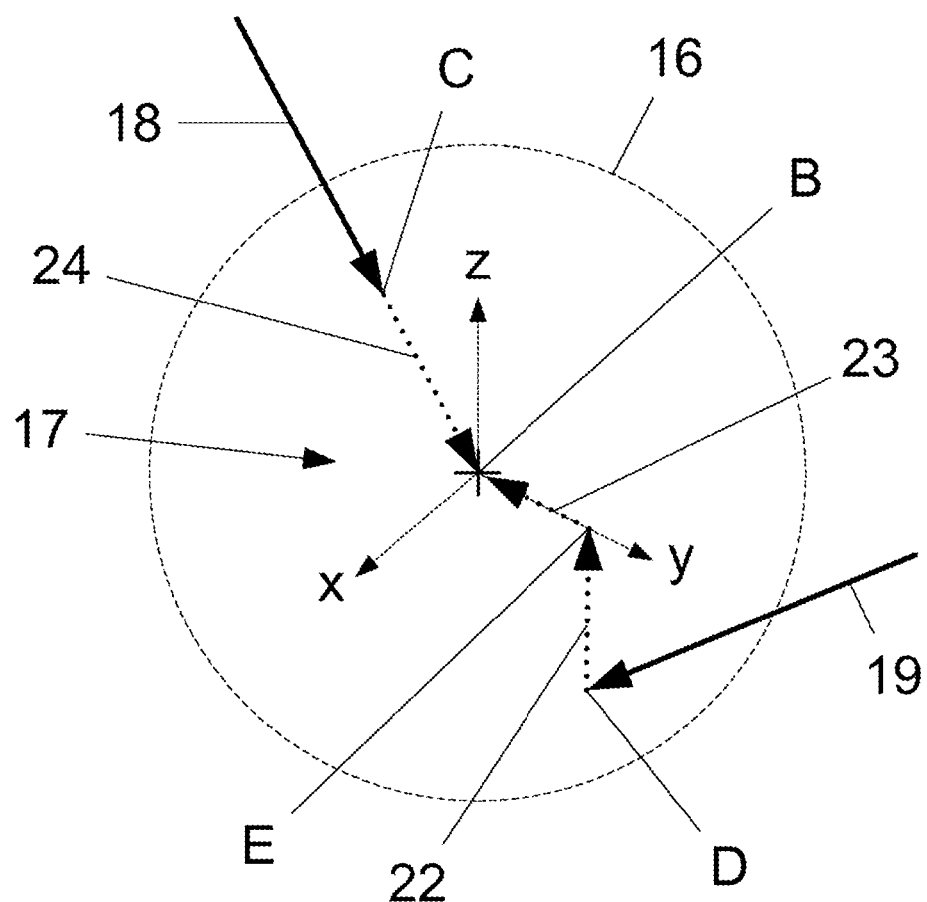

The invention is explained in more detail by way of example below by means of the included drawings. Here are shown:

FIG. 1 a perspective view of a 3D input device known from prior art, having an additional control dial;

FIG. 2 a robot system having a robot which is controlled by means of a 3D input device according to FIG. 1; and FIG. 3 different movement paths covered by the end effector of an instrument.

EMBODIMENTS OF THE INVENTION

FIG. 1 shows an exemplary embodiment of a 3D input device 1 to control a robot 8, as is depicted by way of example in FIG. 2. The 3D control device could, however, also be used to control any other machines or software applications, such as, for example, CAD software. The input device 1 is capable of converting translational and/or rotational control demands in or about all three Cartesian spatial axes into corresponding electrical control signals.

The 3D input device 1 depicted in FIG. 1 comprises a base body 2 having a 3D input element 3 which is formed here in the form of a cap, which is moveably connected to the base body 2. The 3D input element 3 can be moved in the x, y and z direction as well as pivoted or rotated about the axes referred to and forms a part of a 3D sensor, the actual sensor element of which is arranged inside the base body 2. The 3D sensor can be, for example, the 3D measurement system described in the German patent DE 10 2006 058 805.

In the region of the 3D input element 3, a control dial 4 in the form of a wheel is furthermore provided, at which further control demands can be input. Here, the control dial 4 is, just as the 3D input element 3, rotatable about the z axis. Additionally, further operating elements, such as, for example, buttons 6 and/or a display 7 can be arranged on the base body 2.

The 3D input device 1 is configured in such a way that a controlled object, such as, for example, the robot 8 depicted in FIG. 2, can be moved in space both by means of the 3D input element 3 and by means of the control dial 4. According to a preferred embodiment of the invention, the 3D input device 1 is formed in such a way that the object is controlled in terms of position if the control dial 4 is actuated. I.e. the position of the controlled object is dependent on the rotational angle input at the control dial 4.

An actuation of the 3D input element 3 and also of the control dial 4 can be transferred in principle either into a speed control or into a position control of the controlled object 8 or 14. According to a preferred embodiment of the invention, in the case of an actuation of the 3D input elements 3, preferably a speed control, and in the case of an actuation of the control dial 4, a position control is carried out. The control demand input at the 3D input element 3 or control dial 4 is therein transferred into a corresponding speed or position by means of a determined transmission ratio or scaling factor.

In the event that both input elements 3, 4 carry out a position control or both input elements 3, 4 carry out a speed control, the sensitivity of the control dial 4 is preferably lower than that of the 3D input element 3. The user can therefore carry out a rough control by means of the 3D input element and a fine control of the object by means of the control dial.

The type of the control (i.e. position or speed control) and/or the sensitivity can depend on the current position of the controlled object, as will be explained later.

The sensor system of the 3D input element 3 and/or of the control dial 4 can comprise, for example, an optical, magnetic, piezoelectric or any other known sensor element. According to one embodiment of the invention, the control dial 4 generates, for example, a range of pulses during a rotational movement, from which then different movement variables such as, for example, a rotational angle, can be determined. The output signals of the sensor system of the 3D input element 3 and/or of the control dial 4 are processed further by evaluation electronics 21 and converted into corresponding control signals for controlling the actuator(s) of the controlled object 8. The evaluation electronics 21 are also referred to in the scope of this document as a "control" or "control unit" 21 and as a rule consist of hardware and software components. The control unit 21 can, for example, be arranged in the base body 2 or outside of the base body 2, such as, for example, in an external device.

FIG. 2 shows a robot system having a robot 8 which, for example, can be used for minimally invasive surgery. The robot 8 comprises two arm elements 11a, 11b which are connected to each other via a joint 12a. The lower arm element 11a is connected to a base 9 via a joint 12c. The individual joints 12a, 12c are each driven by an electromotor (not shown) and can cause a pivot and/or roll movement of the arm elements 11a, 11b depending on the embodiment.

The robot 8 has a free end which is also referred to as a robot head and is provided on a further joint 12b. Finally, an instrument 13 is fastened to the robot head. During a surgical robot application, this can, for example, be an endoscope, a laparoscopic instrument, a cutting, gripping, holding, connection, sewing instrument or another surgical instrument for minimally invasive surgery. The actual end effector of the instrument 13, such as, for example, a scalpel, scissors, a needle, a scraper, a file, a gripper, etc., is referred to with the reference numeral 14. Tools for non-surgical applications are also possible.

The robot system referred to in FIG. 2 is controlled by means of the 3D input device 1. The output signals of the 3D input device 1 are thereby transferred to a control unit 21 integrated in the base 9, said control unit 21 transferring the control signals received from the input device 1 into corresponding drive signals for the individual actuators of the robot 8, such that the robot 8 or the instrument 14 is moved in the manner provided by the user. In the depicted exemplary embodiment, the reference point for the control of the point A is at the free end of the instrument 13. Optionally, however, another reference point could also be provided.

The movement of the robot arm 8 or of the instrument 13 can be described precisely with respect to a fixed (e.g. Cartesian) coordinate system 17. Typically, the coordinate system 17 refers here to the distal end of the tool 13, the so-called end effector 14, which represents the outermost point A of the robot arm 8. The position of the point A can be clearly defined in the coordinate system 17 by a three-dimensional vector.

A perpendicular pressing on the 3D input element 3 can, for example, cause the end effector 14 to be moved downwards along the z axis. A tilting of the 3D input element 3 can, for example, cause the end effector 14 to pivot about an axis, such as, for example, the y axis.

The control demands as well as the movements of the robot 8 can be overlapped such that any movement curves can be carried out in space with the end effector 14. For example, the end effector 14 can be controlled such that the outermost point A thereof is moved to point B. The movement of point A to point B can, for example, be depicted by a three-dimensional vector 15.

In the depicted exemplary embodiment, the individual joints 12a-12c are formed in such a way that they can each execute a roll as well as a pivot movement. The robot 8 therefore has in total 6 degrees of freedom, such that the instrument 13 can be moved freely in space within the range of the robot arm.

FIG. 3 shows a schematic depiction of different movement paths 18, 19, 22 to 24, along which the instrument 13 or the end effector 14 thereof is moved to a target point B. At the beginning of the action, the end effector 14 is located outside of the depicted region 16. In a first case (see arrows 18 and 24), the end effector 14 is moved along a movement path 18 up to a point C, firstly by means of the 3D input element 3. The 3D input device 1 can therein either execute a speed control or a position control. At point C, the 3D input element is located in the neutral position again. The control 21 can therein determine information concerning the previous movement path 18 and then store the previous movement path 18 of the object which was triggered by the 3D input element 3. In order to move the object 8 or the end effector 14 further to the target point B, the control dial 4 is actuated. Thereby the end effector 14 is moved further along the previous movement direction 18 to the target point B. The relevant movement path is depicted here by a dotted arrow 24. The path extension covered by the end effector 14 is therefore dependent on the rotational angle input at the control dial 4, wherein it is preferably proportional to the rotational angle.

Advantageously, the movement direction of the end effector 14 along the movement path 18 can be determined by the rotational direction of the control dial 4. For example, the end effector 14 would be moved in the direction of the arrow 18 in the case of a positive rotational direction of the control dial 4, but against the direction of the arrow 18 in the case of a negative rotational direction.

In another case, the end effector 14 is moved by corresponding actuation of the 3D input element 3 firstly from an external location (not shown) along a straight movement path 19 to a point D. As can be recognized in FIG. 3, the movement of the object runs past the target point B along the movement path 19. It would therefore not be possible to reach the target point B by simple extrapolation of the previous movement path 19. In order to reach the target point B, in this case the movement direction must be changed. For this purpose, several additional input elements 6, such as, for example, buttons, are available to the user, at which various movement directions can be predetermined in which the object 8 to be controlled or the end effector 14 is moved if the control dial 4 is rotated. By actuating a first button 6, the user, for example, can specify that the end effector 14 is to move in the z direction. By actuating another button 6, for example, the x or y direction or a rotational movement about one of the axes referred to can be selected. In the depicted example, the user firstly selects the z direction such that the end effector 14 is moved along a movement path 22 in the z direction in the case of actuation of the control dial 4 and subsequently the y direction, such that the end effector 14 is moved along the movement path 23 up to the target point B.

In order to achieve that the end effector 14 is moved in a negative y direction, he can, for example, move the control dial 4 counter clockwise. The functionality of the individual buttons 6 is preferably able to be programmed freely.

Therefore, for example, a separate button 6 can be provided for each degree of freedom or a single button 6 can be provided for several degrees of freedom.

As has been explained above, the type of the control—i.e. position control or speed control—and/or the sensitivity of the control can be dependent on the current location of the controlled object 8, 14. According to the invention, for example, a spatial region 16 can be defined which depicts a type of boundary for various operating types of the 3D input device 1. In this case it can be provided that, in the case of an actuation of the 3D input element 3 outside of the region 16, a speed control with a first sensitivity is executed, and within the region 16, a speed control with a second sensitivity is executed, wherein the second sensitivity is preferably lower than the first sensitivity. A determined deflection of the control knob 3 will therefore lead to a lower speed of the controlled object 8, 14 within the region 16 than outside of the region 16. The 3D input device 1 could, however, also be configured such that in the case of an actuation of the 3D input element 3 outside of the region 16, a speed control is executed, and inside the region 16, a position control is executed. Optionally, each could also execute a position control with different sensitivities. The same principles also apply with regard to an actuation of the control dial 4.

The region 16 is preferably selected in such a way that, on the one hand, the target point B corresponds to the central point of the region 16, and on the other hand, that the controlled object 8, 14 can be moved, in the case of a full rotation of the control dial 4, from the edge of the region 16 to the central point B of the region 16. Alternatively, however, finer or coarser transmission ratios can also be selected. For this, the region 16 is preferably freely parameterizable. For example the region 16 can be defined as a sphere with a parameterizable radius, such that practiced users can select a larger radius and unpracticed users can select a smaller radius. The parameters can be deposited in the control 21.

In control and feedback control technology, a control (=open control loop) and a feedback control (=closed control loop) are typically differentiated between conceptually. In this document, deviating from this, provided it is not explicitly specified otherwise, only controls or a control is spoken of for both terms as well as the grammatical variations thereof. I.e. the terms control and feedback control are used synonymously. It is clear to the person skilled in the art that the respective control devices can execute as a control or feedback control.

The invention claimed is:

1. A 3D input device for controlling the position of an object in space along a movement path, comprising a manually operable 3D input element, at which translational and/or rotary control demands can be input in six degrees of freedom, in particular in or about three spatial coordinates, and an additional control dial which, in case of a rotational actuation, generates an output signal which is dependent on the rotational angle, and a control unit which processes the output signal generated by the control dial, wherein the control unit determines information concerning a previous movement path of the object along which the object traveled under control of the 3D input element and, when the control dial is rotated, moves the object in space depending on the determined information concerning the movement path, wherein the type and/or the sensitivity of the control which is performed in case of an actuation of the 3D input element and/or of the control dial is dependent on the location of the controlled object.

2. The 3D input device according to claim 1, wherein the control unit performs a position control of the object depending on the rotational movement input at the control dial, wherein the path covered by the object is dependent on the rotational angle input at the control dial.

3. The 3D input device according to claim 1, wherein one or more further manually operable input elements are provided for inputting of a certain movement direction, and that the control unit moves the object in a certain direction depending on the actuation of one or more of the input elements and on the rotational movement executed at the control dial.

4. The 3D input device according to claim 1, wherein the control unit performs a speed control of the object depending on the control demand which is input at the 3D input element.

5. The 3D input device according to claim 1, wherein the control unit is designed such that the controlled object is moved in a first movement direction in the case of an actuation of the control dial in a first rotational direction, and in the opposite movement direction in the case of an actuation of the control dial in a second rotational direction.

6. The 3D input device according to claim 1, wherein the control unit carries out a first control type within a predetermined local region, and a different second control type outside of the predetermined region.

7. The 3D input device according to claim 1, wherein the sensitivity of the 3D input element and/or of the control dial is lower when the controlled object is located within a predetermined local region than when the controlled object is located outside of the region.

8. The 3D input device according to claim 6, wherein the region is defined in such a way that the object can be moved from the edge of the region to the central point of the region in the case of a certain rotational angle of the control dial.

9. The 3D input device according to claim 8, wherein the central point of the region corresponds to a target point.

10. A method for controlling an object in space by means of a 3D input device which comprises a manually operable 3D input element at which the translational and rotary control demands can be input in six degrees of freedom, in particular in or about three spatial coordinates, and a control dial, comprising the following steps:
  in reaction to an actuation of the 3D input element: movement of the object in space corresponding to the control demand, wherein the type and/or the sensitivity of the control which is performed in case of an actuation of the 3D input element is dependent on the location of the controlled object,
  determining of information concerning the previous movement path of the object along which the object traveled under control of the 3D input element; and
  in reaction to an actuation of the control dial: movement of the object in space depending on the determined information concerning the movement path.

11. The method according to claim 10, wherein the object is moved with positional control in the case of an actuation of the control dial and is moved with speed control in the case of an actuation of the 3D input element.

12. The method according to claim 10, wherein the object is moved with a lower sensitivity in the case of an actuation of the control dial than in the case of an actuation of the 3D input element.

\* \* \* \* \*